United States Patent
Kamiguchi et al.

(10) Patent No.: US 10,580,320 B2
(45) Date of Patent: Mar. 3, 2020

(54) PART MOUNTING POSITION GUIDANCE DEVICE, PART MOUNTING POSITION GUIDANCE SYSTEM, AND PART MOUNTING POSITION GUIDANCE METHOD

(71) Applicant: FANUC CORPORATION, Minamitsuru-gun, Yamanashi (JP)

(72) Inventors: Masao Kamiguchi, Yamanashi (JP); Shouichi Kawakami, Yamanashi (JP); Amane Noro, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 131 days.

(21) Appl. No.: 15/940,224

(22) Filed: Mar. 29, 2018

(65) Prior Publication Data
US 2018/0286274 A1    Oct. 4, 2018

(30) Foreign Application Priority Data
Mar. 31, 2017  (JP) .................................. 2017-072132

(51) Int. Cl.
    G09B 19/00    (2006.01)
    G09B 5/06     (2006.01)
    G08B 5/22     (2006.01)

(52) U.S. Cl.
    CPC .............. *G09B 19/00* (2013.01); *G08B 5/22* (2013.01); *G09B 5/065* (2013.01)

(58) Field of Classification Search
    CPC ........... G09B 19/00; G09B 5/065; G08B 5/22
    USPC ....................................................... 434/309
    See application file for complete search history.

(56) References Cited

U.S. PATENT DOCUMENTS 6,138,056 A    10/2000    Hardesty et al.

FOREIGN PATENT DOCUMENTS

| CN | 104717393 | 6/2015 |
|---|---|---|
| JP | 2001-137757 | 5/2001 |
| JP | 2005-259930 | 9/2005 |
| JP | 2008-059064 | 3/2008 |
| JP | 2011-014658 | 1/2011 |
| WO | 2015/087425 | 6/2015 |

OTHER PUBLICATIONS

Notification of Reasons for Refusal dated Jan. 8, 2019 in corresponding Japanese Patent Application No. 2017-072132.

*Primary Examiner* — Robert P Bullington
(74) *Attorney, Agent, or Firm* — Wenderoth, Lind & Ponack, L.L.P.

(57) ABSTRACT

Provided is a part mounting position guidance device with which an operator can easily recognize a position of a machine in which a part or unit composing a machine having a complexed structure is mounted. The part mounting position guidance device includes a control unit which includes: a position order data acquisition unit that acquires position order data in which one or more pieces of position information of from a predetermined position of a machine to a mounting position of a part are ordered for each part composing the machine; and a guidance display control unit that causes a display unit to display in order, images indicating one or more pieces of position information from an image indicating the predetermined position of the machine to the image indicating the mounting position of the part, on the basis of the position order data acquired by the position order data acquisition unit.

9 Claims, 12 Drawing Sheets

| | HOME | POSITION 1 | POSITION 2 | POSITION 3 |
|---|---|---|---|---|
| UNIT01 | FRONT SURFACE | RIGHT SIDE SURFACE | | R1 |
| UNIT02 | FRONT SURFACE | LEFT SIDE SURFACE | | L1 |
| UNIT03 | FRONT SURFACE | REAR SURFACE | | BI1 |
| UNIT04 | FRONT SURFACE | REAR SURFACE | REAR SURFACE BOX | BB1 |
| UNIT05 | FRONT SURFACE | REAR SURFACE | REAR SURFACE BOX | BB2 |
| ... | ... | ... | ... | ... |

POSITION ORDER TABLE

FIG. 3A

| FRONT SURFACE | FRONT SURFACE IMAGE |
|---|---|
| RIGHT SIDE SURFACE | RIGHT SIDE SURFACE IMAGE |
| LEFT SIDE SURFACE | LEFT SIDE SURFACE IMAGE |
| REAR SURFACE | REAR SURFACE IMAGE |
| REAR SURFACE BOX | REAR SURFACE BOX IMAGE |
| R1 | R1 IMAGE |
| L1 | L1 IMAGE |
| ... | ... |

POSITION IMAGE CORRESPONDENCE TABLE

FIG. 3B

| AL(1) | UNIT03 |
|---|---|
| AL(2) | UNIT01 |
| AL(3) | UNIT05 |
| AL(4) | UNIT04 |
| AL(5) | UNIT02 |
| ... | ... |

ALARM PART CORRESPONDENCE TABLE

FIG. 3C

FRONT SURFACE IMAGE

RIGHT SIDE SURFACE
IMAGE

LEFT SIDE SURFACE
IMAGE

REAR SURFACE IMAGE

REAR SURFACE BOX

R1

R1 IMAGE

L1 IMAGE

BI1 IMAGE

PART MOUNTING POSITION GUIDANCE DEVICE, PART MOUNTING POSITION GUIDANCE SYSTEM, AND PART MOUNTING POSITION GUIDANCE METHOD

This application is based on and claims the benefit of priority from Japanese Patent Application. No. 2017-072132, filed on 31 Mar. 2017, the content of which is incorporated herein by reference.

BACKGROUND OF THE INVENTION

Field of the Invention

The present invention relates to a part mounting position guidance device, a part mounting position guidance system, and a part mounting position guidance method for causing a display device to display a mounting position of a part composing a machine.

Related Art

In a conventional machine having a complexed structure, specifying a mounting position of a defective part is difficult even when an alarm is issued, and the defective part is specified. In regard to this, Patent Document 1 discloses a technique of displaying a drawing of a vehicle that is the same as a vehicle owned by a user, and specifying a defective portion of while utilizing a guidance, in order to specify the defective portion of the vehicle.

Patent Document 1: Japanese Unexamined Patent Application, Publication No. 2001-137757

SUMMARY OF THE INVENTION

A drawing cited in a technique according to Patent Document 1 illustrates with an internal structure that is assumed to be generally known naturally by a person who drives a vehicle. However, when a structure significantly varies depending on a manufacturer, and a machine is a machine tool having a complexed structure, or the like, it is often that, although an operator who actually operates is acquainted with places in a machine that are operated in normal times, such operator is unfamiliar with structures of a side surface and a rear surface of the machine. Thus, even if a defective part and a unit including the defective part are specified, when the part and the unit are in a side surface or a rear surface, mounting positions of the part and the unit are difficult to be recognized.

The present invention is performed in consideration with the problem described above. An object of the present invention is to provide a part mounting position guidance device that guides from a machine position in which the operator usually operates, to a mounting position of a defective portion.

(1) According to the present invention, provided is a part mounting position guidance device (for example, a "part mounting position guidance device 10" described later) including a control unit (for example, a "control unit 11" described later), the control unit including: a position order data acquisition unit (for example, a "position order data acquisition unit 12" described later) that acquires position order data in which one or more pieces of position information of from a predetermined position of a machine to a mounting position of the part are ordered for each part composing a machine (for example, a "machine 30" described later); and a guidance display control unit (for example, a "guidance display control unit 13" described later) that causes a display device (for example, a "display unit 20" described later) to display in order, images indicating the one or more pieces of position information from an image indicating the predetermined position or the machine to an image indicating the mounting position of the part, on the basis of the position order data acquired by the position order data acquisition unit.

(2) In the part mounting position guidance device (for example, the "part mounting position guidance device 10" described later) described in (1), the position order data further includes a correspondence relationship between each piece of position information composing the position order data and an outline drawing of the machine and/or image data of an internal structure drawing of the machine, and the guidance display control unit (for example, the "guidance display control unit 13" described later) preferably causes the display device to display in order, images indicating the one or more pieces of position information from the image indicating the predetermined position of the machine to the image indicating the mounting position of the part, on the basis of the correspondence relationship.

(3) In the part mounting position guidance device (for example, the "part mounting position guidance device 10" described later) described in (1) or (2), the guidance display control unit (for example, the "guidance display control unit 13" described later) further preferably causes the display device to display in order, the images indicating the one or more pieces of position information from the image indicating the predetermined position of the machine to the image indicating the mounting position of a part corresponding to an alarm, on the basis of the correspondence relationship between the alarm and the part, when the machine issues the alarm.

(4) In the part mounting position guidance device (for example, the "part mounting position guidance device 10" described later) described in (2) or (3), the image indicating the predetermined position of the machine preferably is an outline drawing viewing the machine from a position from which an operator's panel of the machine is viewed.

(5) In the part mounting position guidance device (for example, the "part mounting position guidance device 10" described later) described in (1) to (4), the guidance display control unit (for example, the "guidance display control unit 13" described later) preferably causes the display device (for example, the "display unit 20" described later) to display in order, still images with comments.

(6) In the part mounting position guidance device (for example, the "part mounting position guidance device 10" described later) described in (1) to (5), the guidance display control unit (for example, the "guidance display control unit 13" described later) preferably causes the display device (for example, the "display unit 20" described later) to display in order, movies with sound.

(7) In the part mounting position guidance device (for example, the "part mounting position guidance device 10" described later) described in (1) to (6), the position order data is preferably acquired from a storage device (for example a "storage unit 14" described later) in which the position order data is stored.

(8) According to the present invention, provided is a machine (for example, a "machine 30" described later) including the part mounting position guidance device (for example, the "part mounting position guidance device 10" described later) according to any one of claims (1) to (7).

(9) According to the present invention, provided is a part mounting position guidance system (for example, a "part mounting position guidance system 1" described later) including: the part mounting position guidance device (for example, the "part mounting position guidance device 10" described later) according to any one of (1) to (7); and one or more of the machine (for example, the "machine 30" described later) communicatively connected.

(10) According to the present invention, provided is a part mounting position guidance method including: a position order data acquiring step of acquiring position order data in which one or more pieces of position information of from a predetermined position of a machine to a mounting position of the part are ordered for each part composing the machine (for example, the "machine 30" described later); and a step of causing a display device to display in order, images indicating the one or more pieces of position information from an image indicating the predetermined position of the machine to the image indicating the mounting position of the part, on the basis of the position order data acquired by the position order data acquiring step.

According to the present invention, a user can easily recognize a mounting position in a machine, of a part and a unit composing a machine having a complexed structure. Particularly, a part mounting position guidance device of the present invention guides from a machine position in which an operator always operates to a mounting position of a defective part, and thereby, the operator can specify the mounting position of the defective portion in a short time.

BRIEF DESCRIPTION OF THE DRAWINGS

FIG. 3A is an example of a position order table included in position order data according to the first embodiment of the present invention.

FIG. 3B is an example of a position image correspondence table indicating a correspondence relationship between position information and image data according to the first embodiment of the present invention.

FIG. 3C is an example of an alarm part correspondence table indicating a correspondence relationship between an alarm and a part according to the first embodiment of the present invention.

DETAILED DESCRIPTION OF THE INVENTION

First Embodiment

A first embodiment of the present invention will be described in detail below with reference to FIG. 1 to FIG. 6.

Figure 1:
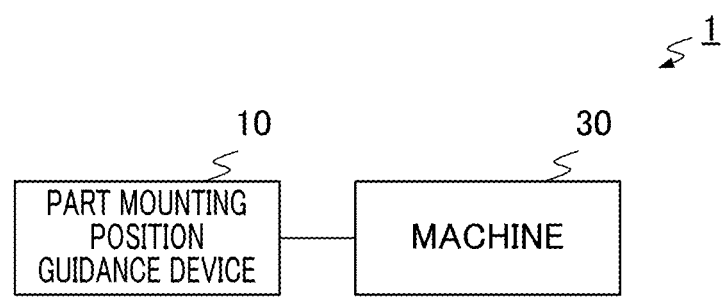
FIG. 1 is an overall configuration diagram of a part mounting position guidance system according to a first embodiment of the present invention.

FIG. 1 is an overall configuration diagram of a part mounting position guidance system 1 according to the present embodiment. The part mounting position guidance system 1 includes a part mounting position guidance device 10 and a machine 30. The part mounting position guidance device 10 and the machine 30 are communicatively connected as a set of one-to-one. The part mounting position guidance device 10 and the machine 30 may be directly connected via a connection interface, or may be connected via a network such as a local area network (LAN).

The part mounting position guidance device 10 is a device that causes a display unit 20 described later to display in order, images indicating position information of from a predetermined position of the machine 30 to a mounting position of the part, for each part composing the machine 30.

The machine 30 is a device such as an industrial robot, a machine tool, or the like, installed in a factory. The machine 30 includes an operation processing device, a storage device, an input and output device by an operator, and the like, and can be controlled by software. Although one function block represents the machine 30 in FIG. 1, the machine 30 may be combination of a plurality of devices, such as combination of an industrial robot or a machine tool with a numerical control device that controls the industrial robot or the machine tool. A machine tool is, for example, a lathe, a milling machine, an electrical discharge machine, a grinding machine, a machining center, or a laser machine.

Figure 2:
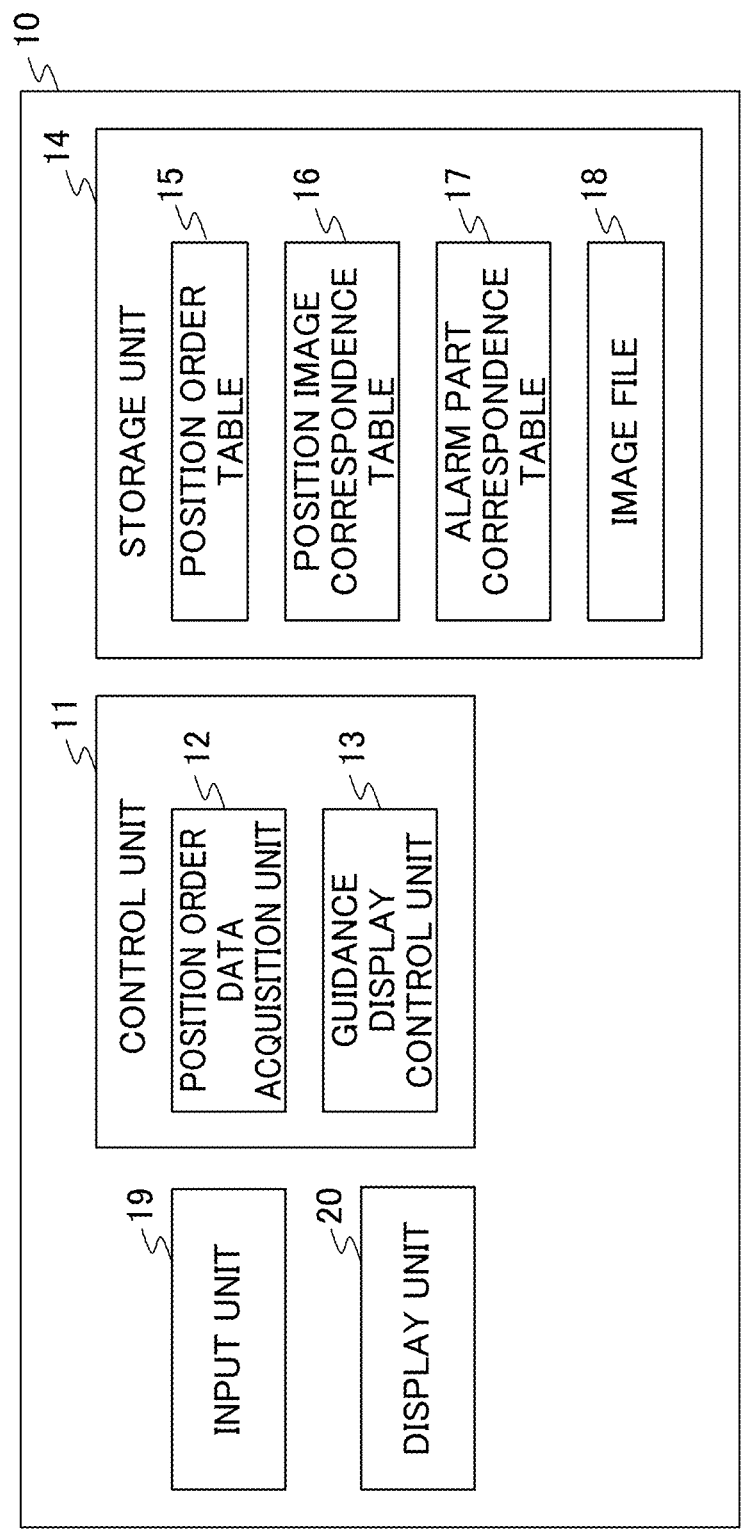
FIG. 2 is an overall configuration diagram of the part mounting position guidance device according to the first embodiment of the present invention.

FIG. 2 is an overall configuration diagram of the part mounting position guidance device 10. The part mounting position guidance device 10 includes a control unit 11, a storage unit 14, an input unit 19, and a display unit 20.

The control unit 11 is a unit that controls the entire part mounting position guidance device 10, and realizes various functions in the present embodiment by reading various programs as appropriate from a storage region such as a ROM, a RAM, flash memory, or a hard disk (HDD), and executing the programs. The control unit 11 may be a CPU. The control unit 11 includes a position order data acquisition unit 12, and a guidance display control unit 13. Details of functions of the position order data acquisition unit 12 and the guidance display control unit 13 will be described later. In addition, the control unit 11 includes general function blocks such as a function block for controlling the entire part mounting position guidance device 10, and a function block for performing communication. However, since these general function blocks are well known to a person skilled in the art, illustration and description thereof are omitted.

The storage unit 14 stores a position order table 15, a position image correspondence table 16, an alarm part correspondence table 17, and an image file 18, as position order data. Hereinafter, each table, and contents of image files will be described in detail with reference to FIG. 3A to FIG. 3C, and FIG. 4A to FIG. 4I.

FIG. 3A shows a position order table 15 that, for example, defines the order of position information with which guidance is performed from a predetermined position that is a front surface viewing a machine from a position from which an operator's panel of the machine is viewed, to a mounting position of each part composing the machine 30. Particularly, the position order table 15 of FIG. 3A defines the order of display of images indicating a position n in the order of "position 1" to "position 2" to "position 3" (mounting position) after an image of "home" corresponding to the "predetermined position" described above is displayed, for each part (UNIT01 to UNIT05).

For example, for data of the first line, it is defined that, when a mounting position of a part being "UNIT01" is displayed in the display unit 20 described later, an image of a "front surface" is initially displayed as the "home", an image of a "right side surface" is secondarily displayed as the "position 1", and a portion that is "R1" in an image of a "right side surface" is thirdly displayed as the "position 3" (a mounting position of UNIT01). For example, for data of the fourth line, it is defined that, when a mounting position of part being "UNIT04" is displayed in the display unit 20, an image of a "front surface" is initially displayed as the "home", an image of a "rear surface" is secondarily displayed as the "position 1", an image of a "rear surface BOX" is thirdly displayed as the "position 2", and an image of "BB1" is fourthly displayed as the "position 3" (a mounting position of UNIT04).

FIG. 3B shows the position image correspondence table 16 that defines a correspondence relationship between each piece of the position information indicated in the position order table 15 of FIG. 3A, and each piece of the image data shown in FIG. 4A to FIG. 4I described later. For example, it is defined that, in data of the first line in the position image correspondence table 16 of FIG. 3B, the position information "front surface" indicated in the position order table 15 of FIG. 3A corresponds to image data of the "front surface image" shown in FIG. 4A described later. It is indicated that, in data of the second line in the position image correspondence table 16 of FIG. 3B, the position information "right side surface" indicated in the position order table 15 of FIG. 3A corresponds to image data of the "right side surface image" shown in FIG. 4B described later. It is indicated that, in data of the third line in the position image correspondence table 16 of FIG. 3B, the position information "left side surface" indicated in the position order table 16 of FIG. 3A corresponds to image data of a "left side surface image" shown in FIG. 4C described later. It is defined that, in data of the fourth line in the position image correspondence table 16 of FIG. 3B, the position information "rear surface" indicated in the position order table 15 of FIG. 3A corresponds to image data of "rear surface image" shown in FIG. 4D described later. It is defined that, in data of the fifth line in the position image correspondence table 16 of FIG. 3B, the position information "rear surface BOX" indicated in the position order table 15 of FIG. 3A corresponds to a "rear surface BOX image" shown in FIG. 4E described later. It is indicated that, in data of the sixth line in the position image correspondence table 16 of FIG. 3B, position information "R1" indicated in the position order table 15 of FIG. 3A corresponds to image data of an "R1 image" shown in FIG. 4F described later. It is indicated that, in data of the seventh line in the position image correspondence table 16 of FIG. 3B, position information "L1" indicated in the position order table 15 of FIG. 3A corresponds to image data of "L1 image" shown in FIG. 4O described later. Although it is not shown in FIG. 3B, at is defined that position information "BB1" indicated in the position order table 15 of FIG. 3A corresponds to a "BB1 image" shown by using an image of FIG. 4I described later.

In the position order table 15, columns of the "position 2" of "UNIT01" to "UNIT03" are blank. This is because a code represented by the "position 3" is included in an image corresponding to the "position 1". For example, it is defined that, for the "UNIT01", in a column of the "position 3", the "R1 image" shown in FIG. 4F described later is represented. As shown in FIG. 4F described later, the "R1 image" is obtained by adding a code to the "right side surface image" (FIG. 4B described later) corresponding to the "position 1". Since there is no need to define display of the "right side surface image" again in the column of the "position 2", the column of the "position 2" is blank. The columns of the "position 2" of "UNIT02" and "UNIT03" are blank by the similar reason.

FIG. 3C shows the alarm part correspondence table 17 defining a correspondence relationship between each alarm issued by the machine 30, and each part number of the parts composing the machine 30. For example, it is defined that, in data of the first line in the alarm part correspondence table 17 of FIG. 3C, an alarm "AL(1)" corresponds to a part of the part number "UNIT03".

Figure 4A:
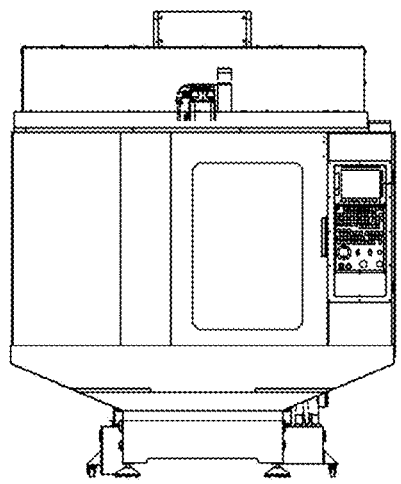
FIG. 4A is an example of a front surface image included in an image file according to the first embodiment of the present invention.
Figure 4B:
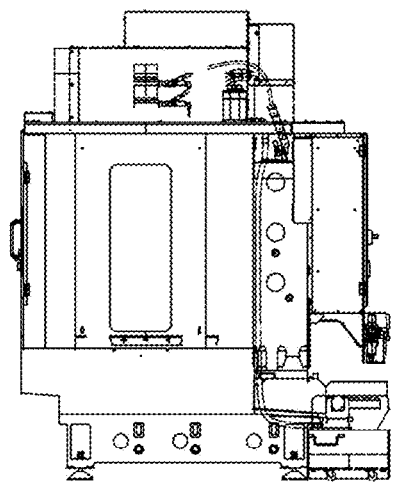
FIG. 4B is an example of a right side surface image included in the image file according to the first embodiment of the present invention.
Figure 4C:
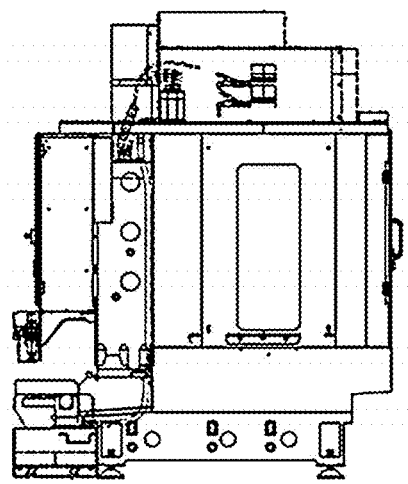
FIG. 4C is an example of a left side surface image included in the image file according to the first embodiment of the present invention.
Figure 4D:
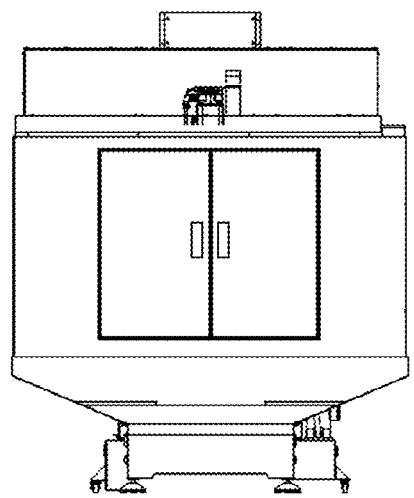
FIG. 4D is an example of a rear surface image included in the image file according to the first embodiment of the present invention.
Figure 4E:
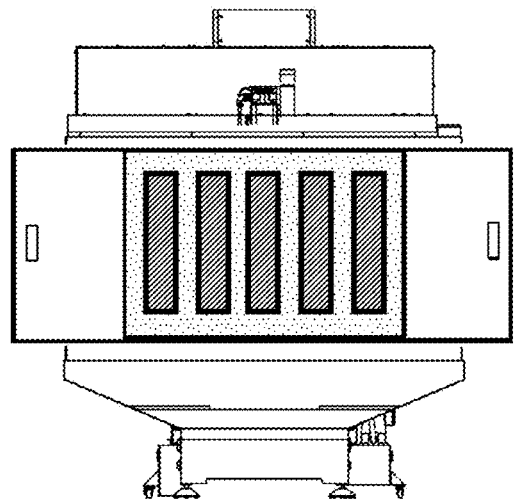
FIG. 4E is an example of a rear surface BOX image included in the image file according to the first embodiment of the present invention.
Figure 4F:
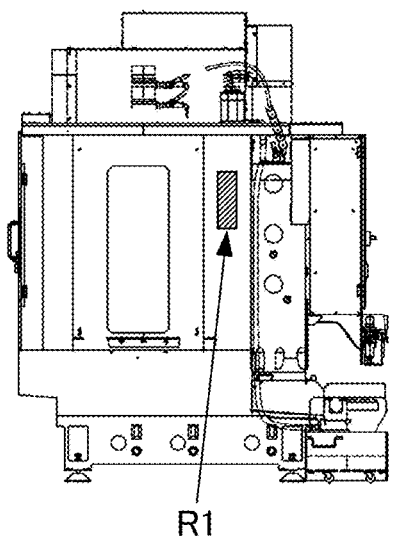
FIG. 4F is an example of an image indicating a position "R1" included in the image file according to the first embodiment of the present invention.
Figure 4G:
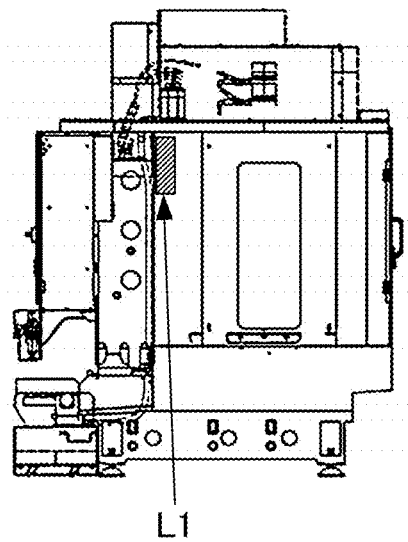
FIG. 4G is an example of an image indicating a position "L1" included in the image file according to the first embodiment of the present invention.
Figure 4H:
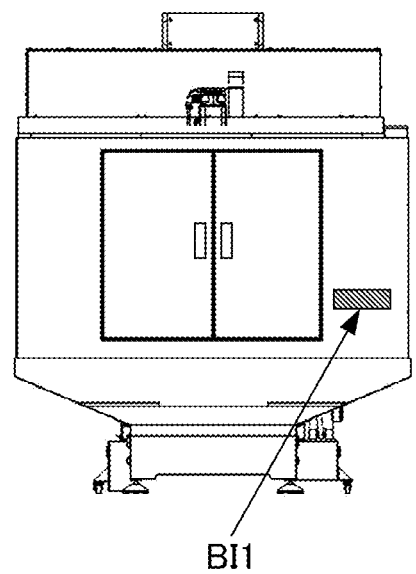
FIG. 4H is an example of an image indicating a position "BI1" included in the image file according to the first embodiment of the present invention.
Figure 4I:
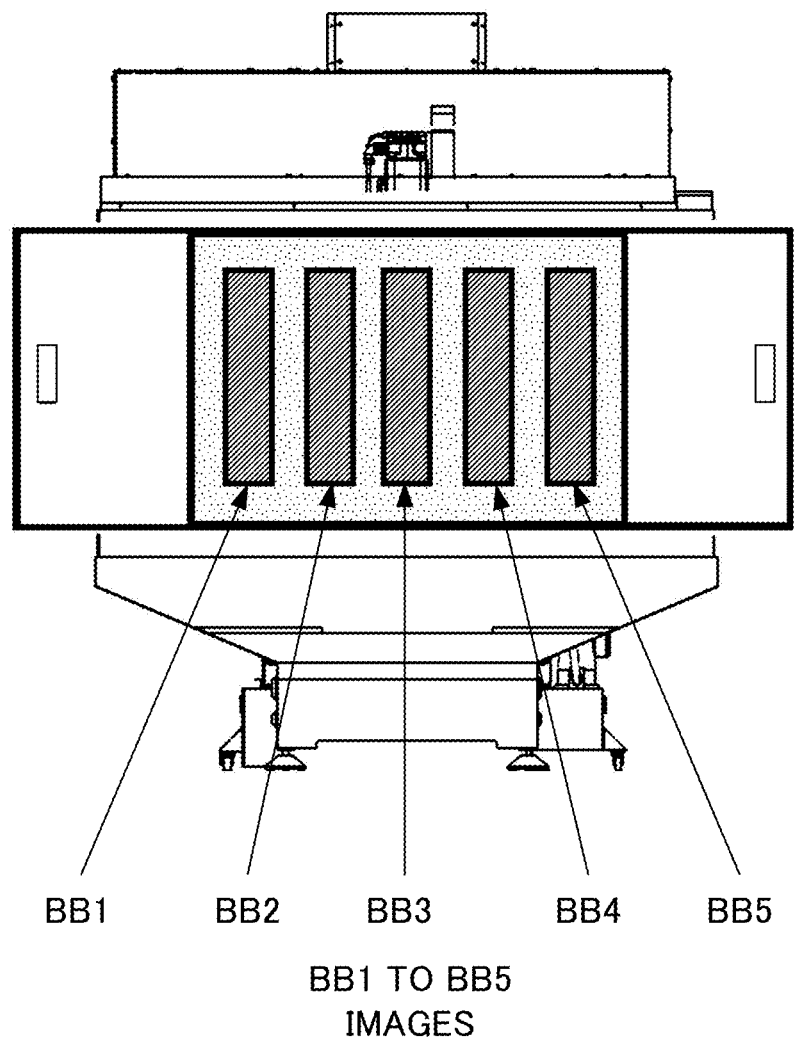
FIG. 4I is an example of an image indicating positions "BB1" to "BB5" included in the image file according to the first embodiment of the present invention.

FIG. 4A to FIG. 4I show image data corresponding to each piece of position information included in the image file 18. FIG. 4A is a front surface image of the machine 30. FIG. 4B is a right side surface image of the machine 30. FIG. 4C is a left side surface image of the machine 30. FIG. 4D is a rear surface image of the machine 30. FIG. 4E is a rear surface BOX image indicating each BOX installed in the rear surface of the machine 30. FIG. 4F is an image indicating a position "R1". FIG. 4G is an image indicating a position "L1". FIG. 4H is an image indicating a position "BI1". FIG. 4I is an image collectively indicating codes of each BOX indicated in the rear surface BOX image. Particularly, FIG. 4I indicates that the rear surface BOX is indicated by codes of "BB1", "BB2", "BB3", "BB4", and "BB5" in this order from left. When the image of FIG. 4I is actually used, the image is used as a "BB1 image" indicating only a code "BB1", a "BB2 image" indicating only a code "BB2", a "BB3 image" indicating only a code "BB3", a "BB4 image" indicating only a code "BB4", and a "BB5 image" indicating only a code "BB5.

Among each piece of the image data, an image corresponding to the position information of "home" of the position order table 15 of FIG. 3A preferably is an outline drawing viewing the machine 30 from a position from which the operator's panel of the machine 30 is viewed.

Next, the control unit 11 will be described. The position order data acquisition unit 12 refers to the position order table 15, the position image correspondence table 16, the alarm part correspondence table 17, and the image file 18 in order to acquire the position order data in which one or more pieces of position information of from a predetermined position of the machine to the mounting position of the part are ordered for each part composing the machine 30. More particularly, when the machine 30 issues an alarm, the position order data acquisition unit 12 refers to the alarm part correspondence table 17 to specify the part number corresponding to the alarm, refers to the position order table 15 to specify the position order corresponding to the part number, and refers to the position image correspondence table 16 to specify the image corresponding to each piece of position information included in the position order.

The guidance display control unit 13 causes the display unit 20 to display in order, images indicating one or more pieces of position information from the image indicating the predetermined position of the machine, to the image indicating the mounting position of the part, on the basis of the position order data acquired by the position order data acquisition unit 12. More particularly, the guidance display control unit 13 causes the display unit 20 to display the image corresponding to each piece of position information included in the position order, specified by the position order data acquisition unit 12.

The input unit 19 is a device used for inputting the part numbers of the parts composing the machine 30, by the operator of the part mounting position guidance device 10.

The display unit 20 is a device used for displaying images indicating one or more pieces of position information from the image indicating the predetermined position of the machine to the image indicating the mounting position of the part, by the control from the guidance display control unit 13 described above.

Figure 5:
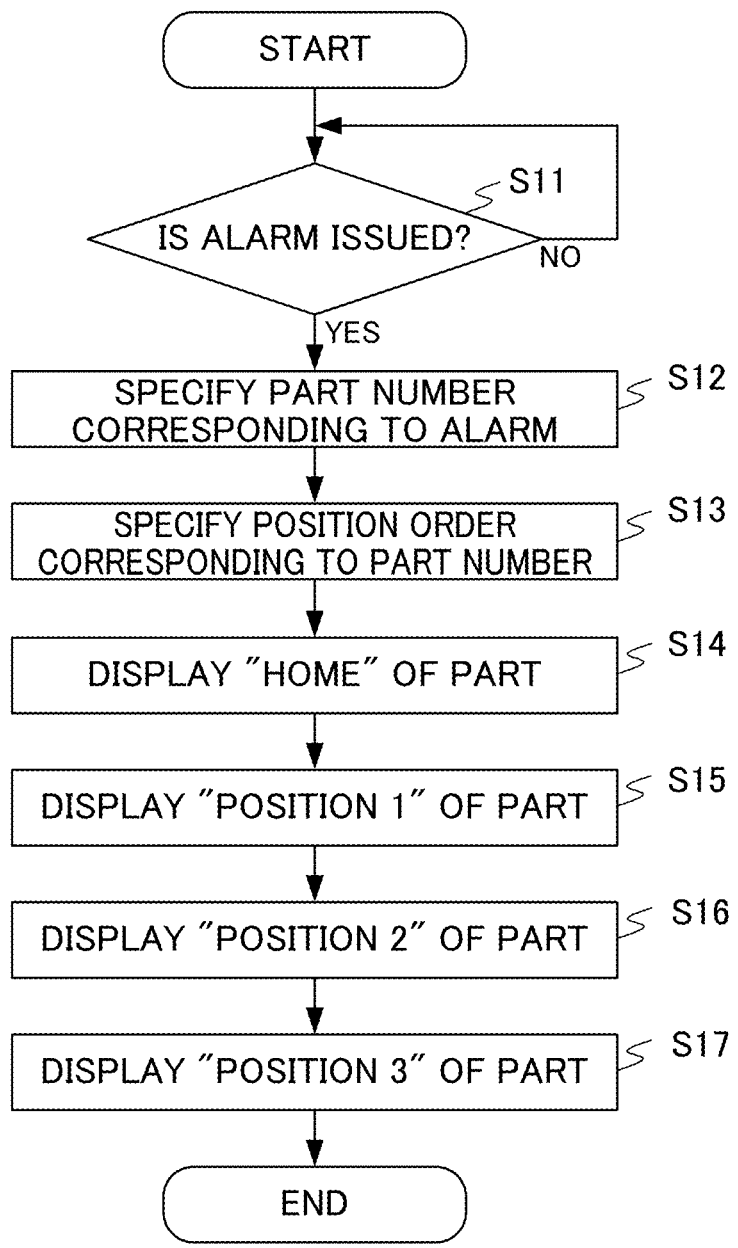
FIG. 5 is a flowchart indicating operation of the part mounting position guidance device according to the first embodiment of the present invention.

Next, processing flow of the part mounting position guidance device 10 will be described. FIG. 5 is a flowchart indicating operation of the part mounting position guidance device 10. With reference to FIG. 5, when an alarm is issued at step S11 (S11: YES), the processing proceeds to step S12. When an alarm is not issued (S11: NO), the processing returns to step S11.

At step S12, the position order data acquisition unit 12 acquires the alarm part correspondence table 17 from the storage unit 14 and refers to the alarm part correspondence table 17 to specify the part number corresponding to the alarm.

At step S13, the position order data acquisition unit 12 acquires the position order table 15 from the storage unit 14 and refers to the position order table 15 to specify the position order corresponding to the part number specified at step S12.

At step S14, the position order data acquisition unit 12 acquires the position image correspondence table 16 from the storage unit 14, and refers to the position image correspondence table 16 to specify the image corresponding to the position of the "home" in the position order specified at step S13. The guidance display control unit 13 causes the display unit 20 to display the image specified by the position order data acquisition unit 12.

At step S15, the position order data acquisition unit 12 refers to the position image correspondence table 16 to specify the image corresponding to the position of the "position 1" in the position order specified at step S13. The guidance display control unit 13 causes the display unit 20 to display the image specified by the position order data acquisition unit 12.

At step S16, the position order data acquisition unit 12 refers to the position image correspondence table 16 to specify the image corresponding to the position of the "position 2" in the position order specified at step S13. The guidance display control unit 13 causes the display unit 20 to display the image specified by the position order data acquisition unit 12.

At step S17, the position order data acquisition unit 12 refers to the position image correspondence table 16 to specify the image corresponding to the position of the "position 3" in the position order specified at step S13. The guidance display control unit 13 causes the display unit 20 to display the image specified by the position order data acquisition unit 12, and ends the operation flow.

In the operation flow, at steps S14 to S17, when the guidance display control unit 13 causes the display unit 20 to display in order, the images indicating one or more pieces of position information, the display unit 20 may display in order, still images with comments. Otherwise, the guidance display control unit 13 causes the display unit 20 to display in order, movies with sound.

Figure 6:
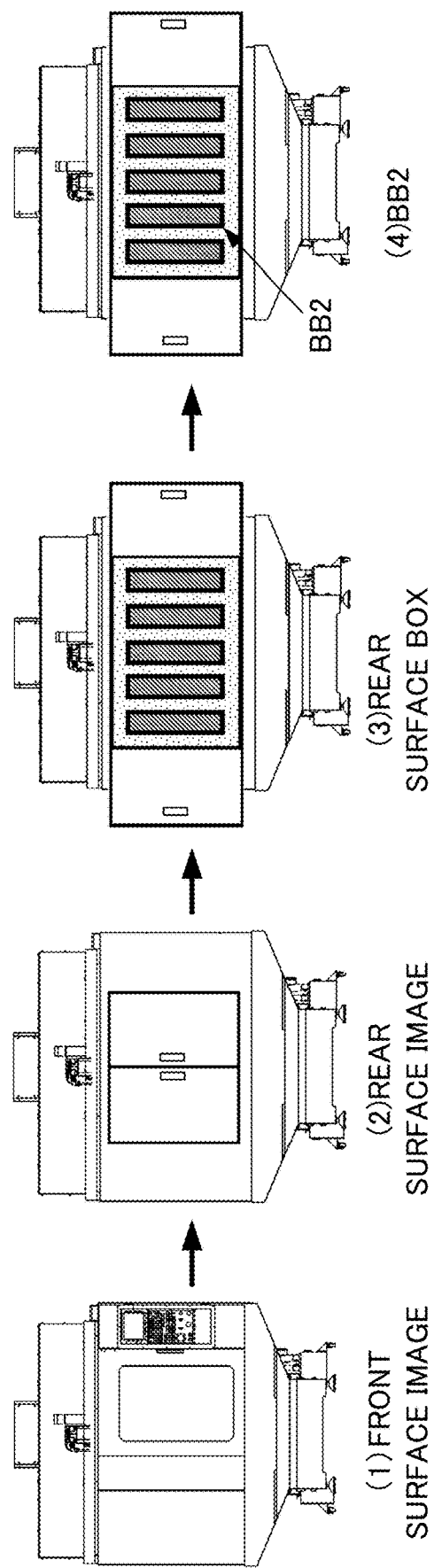
FIG. 6 is an example of a screen transition in guidance performed by the part mounting position guidance device according to the first embodiment of the present invention.

Next, specific operation of the part mounting position guidance device 10, and transition of a display screen of when the alarm is "AL(3)", will be described with reference to FIG. 6.

When the alarm is "AL(3)", the position order data acquisition unit 12 specifies that the alarm "AL(3)" corresponds to the part number "UNIT05", from the alarm part correspondence table 17. Next, the position order data acquisition unit 12 specifies that the position order corresponding to the part number "UNIT05" is "home: front surface" to "position 1: rear surface" to "position 2: rear surface BOX" to "position 3: BB2", from the position order table 15.

Next, the position order data acquisition unit 12 specifies that the image corresponding to the "front surface" is the "front surface image", the image corresponding to the "rear surface" is the "rear surface image", the image corresponding to the "rear surface BOX" is the "rear surface BOX image", and the image corresponding to the "BB2" is the "BB2 image", from the position image correspondence table 16. According to this, the guidance display control unit 13 causes the display unit 20 to initially display the front surface image of FIG. 4A, secondarily display the rear surface image of FIG. 4D, thirdly display the rear surface BOX image of FIG. 4E, and finally display the image of FIG. 4I as an image indicating that the code is "BB2".

In the embodiment described above, when the alarm is issued in the machine 30, the part mounting position guidance device 10 is configured to guide the mounting position of the part corresponding to the alarm. However, the configuration is not limited thereto. For example, when a part composing the machine 30 needs to be repaired, in a periodical maintenance in a stage where the alarm is not issued, a maintenance engineer inputs the part number of the part from the input unit 19, and the part mounting position guidance device 10 can specify the position order data corresponding to the part number to guide the mounting position of the part.

Effect of First Embodiment

According to the present embodiment, the control unit 11 of the part mounting position guidance device 10 includes the position order data acquisition unit 12 and the guidance display control unit 13. The position order data acquisition unit 12 refers to the position order table 15, the position image correspondence table 16, the alarm part correspondence table 17, and the image file 18 to acquire the position order data from the storage unit 14. The guidance display control unit 13 causes the display unit 20 to display in order, the images indicating one or more pieces of position information from the image indicating the predetermined position of the machine 30 to the image indicating the mounting position of the part, on the basis of the position order data acquired by the position order data acquisition unit 12. Thereby, the part mounting position guidance device 10 guides from the machine position in which the operator usually operates to the mounting position of a defective portion. Thus, the operator can specify the mounting position of the defective portion in a short time.

The position order data includes the correspondence relationship between each piece of position information and the outline drawing of the machine 30, and/or image data of the internal configuration diagram of the machine 30. Thus, when one or more pieces of position information are displayed, the information can be displayed by using an image. Thereby, the operator of the machine 30 can recognize the mounting position of the part from the image corresponding to each piece of the position information, more easily.

When the machine 30 issues an alarm, the part mounting position guidance device 10 causes the display unit 20 to display the image indicating one or more pieces of position information from the image indicating the predetermined position of the machine 30 to the image indicating the mounting position of the part corresponding to the alarm, on the basis of the correspondence relationship between the alarm and the part, acquired by referring to the alarm part correspondence table 17. Thereby, when failure occurs in the machine 30, the operator of the machine 30 can easily recognize the mounting position of the defective part.

The image indicating the predetermined position of the machine 30 described above is, for example, an outline drawing viewing the machine 30 from the position from which the operator's panel of the machine 30 is viewed. Thereby, the operator can specify the mounting position of the defective part in a short time.

The guidance display control unit 13 can cause the display unit 20 to display in order, still images with comments, and can cause the display unit 20 to display in order movies with sound. Thereby, the operator of the machine 30 can easily specify the mounting position of the part.

Second Embodiment

Figure 7:
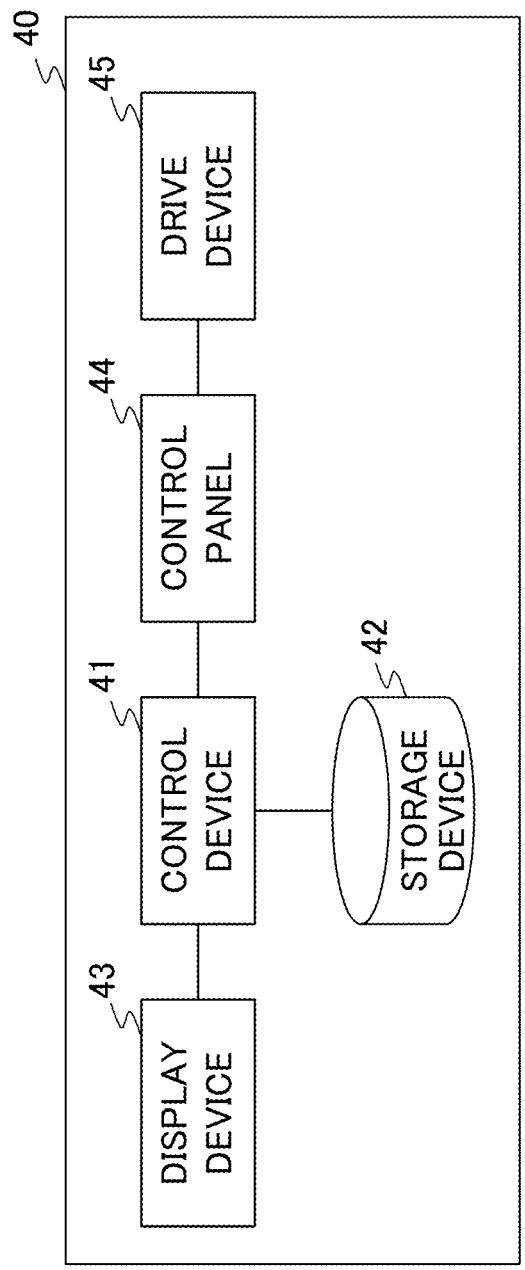
FIG. 7 is an overall configuration diagram of a machine including a part mounting position guidance device according to a second embodiment of the present invention.

In a second embodiment of the present invention, the machine 30 in the first embodiment includes the part mounting position guidance device 10 as a part of the machine 30 itself. Hereinafter, the second embodiment of the present invention will be described with reference to FIG. 7. FIG. 7 is an overall configuration diagram of a machine 40 according to the second embodiment of the present invention. The machine 40 includes a control device 41, a storage device 42, a display device 43, a control panel 44, and a drive device 45.

The control device 41 includes the position order data acquisition unit 12, and the guidance display control unit 13, as similar to the control unit 11 of the part mounting position guidance device 10 according to the first embodiment, as a part of the control device 41. The control device 41 detects an alarm of the drive device 45. In addition, the control device 41 includes general function blocks such as a function block for controlling the drive device 45, a function block for performing communication, and a function block for receiving operation by the user. However, since these general function blocks are well known to a person skilled in the art, illustration and description thereof are omitted.

The storage device 42 stores the position order table 15, the position image correspondence table 16, the alarm part correspondence table 17, and the image file 18, as similar to the storage unit 14 of the part mounting position guidance device 10 according to the first embodiment.

The display device 43 has the same function as the display unit 20 of the part mounting position guidance device 10 according to the first embodiment. Particularly, the display device 43 displays the image indicating one or more pieces of position information of from the image indicating the predetermined position of the machine to the image indicating the mounting position of the part, by the control from the guidance display control unit 13.

The control panel 44 is a control panel used for electrically controlling the operation of the drive device 45 described later, and may include, for example, a electromagnetic switch, an inverter, a servo driver, a servo amplifier, a selector switch, and a sequencer.

The drive device 45 is a device driven when a work such as cutting or machining is performed by the machine 40, and may include, for example, a spindle motor, and a feed axis motor.

In the machine 40, if an alarm is issued during the actual performing of cutting, machining, or the like, by the operator, the control device 41 specifies the part number corresponding to the alarm, to cause the display device 43 to display in order, images from an image indicating a predetermined position of the machine 40, to an image indicating a mounting position of a defective part, by using the position order data corresponding to the part number.

Effect of Second Embodiment

In the present embodiment, the machine 40 itself has the same function as that of the part mounting position guidance device 10 according to the first embodiment. More particularly, the machine 40 includes a control device 41 including the same function as that of the control unit 11 of the part mounting position guidance device 10, a storage device 42 including the same data as that of the storage unit 14 of the part mounting position guidance device 10, and a display device 43 having the same function as that of the display unit 20 of the part mounting position guidance device 10. Thereby, the operator of the machine 40 can quickly specify a mounting position of a defective part only by operation to the same machine when an alarm is issued during the operation of the machine 40.

Third Embodiment

Figure 8:
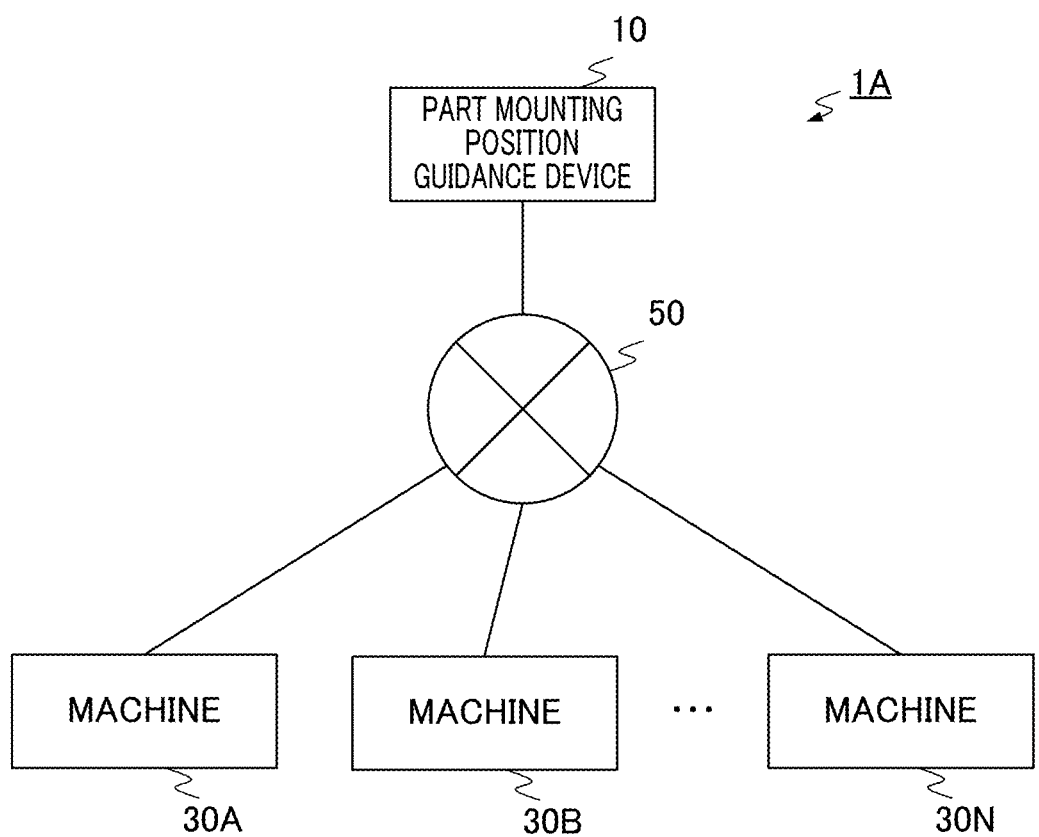
FIG. 8 is an overall configuration diagram of a part mounting position guidance system according to a third embodiment of the present invention.

Hereinafter, a third embodiment of the present invention will be described with reference to FIG. 8. The third embodiment is a system that guides a mounting position of a part composing one or more machines 30 to which the part mounting position guidance device 10 in the first embodiment is connected via a network. FIG. 8 is an overall configuration diagram of a part mounting position guidance system 1A according to the present embodiment. The same components as those in the part mounting position guidance system 1 according to the first embodiment, are shown with the same reference numerals, and description of functions thereof will be omitted.

The part mounting position guidance system 1A includes a part mounting position guidance device 10, machines 30A to 30N, and a network 50.

In the part mounting position guidance system 1A, when a failure occurs in any of the machines 30A to 30N, the machine with the failure notifies the part mounting position guidance device 10 with an alarm, via the network 50. When being notified with the alarm, the part mounting position guidance device 10 refers to the position order table 5, the position image correspondence table 16, the alarm part correspondence table 17, and the image file 18, to acquire the position order data from the storage unit 14. The part mounting position guidance device 10 causes the display unit 20 to display in order, the images indicating one or more pieces of position information from the image indicating the predetermined position of the machine in which the failure occurs, to the image indicating the mounting position of the defective part, in the same flow as the operation flow of FIG. 7 according to the first embodiment.

The part mounting position guidance device 10 connects with the machines 30A to 30N via the network. Thus, the part mounting position guidance device 10 can be installed in other portions than the machines 30A to 30N, for example, a service center or a call center. Particularly, the part mounting position guidance system 1A is incorporated in a factory monitor system utilizing a network, and the part mounting position guidance device 10 is installed in a service center of the factory monitor system. Thereby, when a failure occurs in a machine of a factory, sending of a field service person to the factory becomes unnecessary, an optimal part can be delivered, and an optimal field service person can be promptly sent.

The part mounting position guidance device 10 may have a function as a management device that centralized controls the machines 30A to 30N. The storage unit 14 of the part mounting position guidance device 10 may be installed on the network 50, as a separate storage device from the part mounting position guidance device 10.

Effect of Third Embodiment

In the present embodiment, one part mounting position guidance device 10 can guide a mounting position of a part of one or more machines 30. Thereby, an operator who manages the one or more machines 30, can check only the display unit 20 of the part mounting position guidance device 10 to recognize in order, the position information from the predetermined position of the one or more machines 30 to the mounting position.

Modification

The embodiments of the present invention are described above. However, the present invention is not limited to the embodiments described above. The effects described in the embodiments are only most suitable effects generated by the present invention listed. The effects of the present invention are not limited to hose described in the embodiments.

In the embodiments described above, the present invention is configured so that one part corresponds to one alarm. However, the configuration is not limited thereto. For example, a plurality of parts may correspond to one alarm so that the part mounting position guidance device 10 guides the mounting positions of the plurality of parts.

The all or a part of components of the part mounting position guidance device 10, for example, the control unit 11 may be installed on a network, and may be installed as a virtual server on a cloud.

A guidance method by the part mounting position guidance system 1 or 1A is realized by software. When the method is realized by software, programs configuring the software are installed in a computer. These programs may be recorded in a removable media to be distributed to a user, and may be downloaded to a computer of the user via a network to be distributed.

EXPLANATION OF REFERENCE NUMERALS 1 1A Part mounting position guidance system
10 Part mounting position guidance device
11 Control unit
12 Position order data acquisition unit
13 Guidance display control unit
14 Storage unit
15 Position order table
16 Position image correspondence table
17 Alarm part correspondence table
18 Image file
19 Input unit
20 Display unit
30 40 Machine
41 Control device
42 Storage device
43 Display device
44 Control panel
45 Drive device
50 Network

What is claimed is:

1. A part mounting position guidance device comprising a control unit,
   the control unit comprising:
   a position order data acquisition unit that acquires position order data in which one or more pieces of position information of from a predetermined position of a machine to a mounting position of the part are ordered for each part composing the machine; and
   a guidance display control unit that causes a display device to display in order, images indicating the one or more pieces of position information from an image indicating the predetermined position of the machine to an image indicating the mounting position of the part, on the basis of the position order data acquired by the position order data acquisition unit wherein the position order data further includes a correspondence relationship between each piece of position information composing the position order data, with image data of an outline drawing of the machine and/or an internal configuration diagram of the machine, and
   the guidance display control unit causes the display device to display in order, images indicating the one or more pieces of position information of from the image indicating the predetermined position of the machine to the image indicating the mounting position of the part on the basis of the correspondence relationship.

2. The part mounting position guidance device according to claim 1, wherein the guidance display control unit further causes the display device to display in order, the images indicating the one or more pieces of position information of from the image indicating the predetermined position of the machine to the image indicating the mounting position of the part corresponding to the alarm, on the basis of the correspondence relationship between an alarm and the part, when the machine issues the alarm.

3. The part mounting position guidance device according to claim 2, wherein the image indicating the predetermined position of the machine is an outline drawing viewing the machine from a position from which an operator's panel of the machine is viewed.

4. The part mounting position guidance device according to claim 1, wherein the guidance display control unit causes the display device to display in order, still images with comments.

5. The part mounting position guidance device according to claim 1, wherein the guidance display control unit causes the display device to display in order, movies with sound.

6. The part mounting position guidance device according to claim 1, wherein the position order data is acquired from a storage device that stores the position order data.

7. A machine comprising the part mounting position guidance device according to claim 1.

8. A part mounting position guidance system comprising: the part mounting position guidance device according to claim 1; and one or more of the machine communicatively connected.

9. A part mounting position guidance method comprising: a position order data acquisition step of acquiring position order data in which one or more pieces of position information of from a predetermined position of a machine to a mounting position of the part are ordered for each part composing the machine; and a step of causing a display device to display in order, images indicating the one or more pieces of position information of from an image indicating the predetermined position of the machine to an image indicating the mounting position of the part on the basis of the position order data acquired by the position order data acquisition step, wherein the position order data further includes a correspondence relationship between each piece of position information composing the position order data, with image data of an outline drawing of the machine and/or an internal configuration diagram of the machine, and in the step of causing a display device to display in order, causing the display device to display in order, images indicating the one or more pieces of position information of from the image indicating the predetermined position of the machine to the image indicating the mounting position of the part on the basis of the correspondence relationship.

* * * * *